3,311,585
Patented Mar. 28, 1967

3,311,585
FIRE-RESISTANT REFLECTIVE COATINGS OF FIBROUS POTASSIUM TITANATE, COLLOIDAL SILICA AND ELASTOMERIC LATEX
Frank E. Edlin, Wilmington, Del., assignor to E. I. du Pont de Nemours and Company, Wilmington, Del., a corporation of Delaware
No Drawing. Filed Nov. 27, 1964, Ser. No. 414,413
6 Claims. (Cl. 260—29.7)

This invention relates to fire-resistant reflective insulating compositions and to their use. More particularly, this invention is directed to aqueous compositions comprising water insoluble fibrous potassium titanate, colloidal silica and a latex-type elastomeric material, which upon drying form an adherent heat reflectant coating, to the use of such compositions and to the fire-resistant reflective insulating coatings which they form.

Flames emit radiant energy for the most part in the visible and near infrared wave bands generally shorter than six microns. A surface having the highest effective reflectance will possess the greatest capability to reject this radiant energy. Since no perfect reflectors are known, some amount of the radiant energy will always be absorbed by a surface. This energy which is absorbed, can be re-emitted as radiation of a much longer wavelength generally corresponding to the temperature of the surface. Therefore, a surface which is capable of efficiently emitting the radiation of the longer wavelength corresponding to its temperature is also very desirable to aid in forestalling combustion temperatures.

I have discovered a composition, which when dried to an adherent coating, reflects from 93 to 95 percent of all radiation having a wavelength between 0.35 and 2.1 microns. This wavelength includes the visible wave band which is between 0.4 and 0.7 micron and also the near infrared wave band usually considered to extend from 0.7 to 2 microns. Further, these coatings emit radiation from bodies at near ambient temperature up to 400° F. with high efficiency. At 140° F. the coatings emit radiation equivalent to 96 to 98 percent of the radiation which would be emitted by a perfect black body.

To put these excellent optical properties into perspective, the reflectance over the broad wave band of 0.35 to 2.1 microns of the compositions of this invention, when dried to a coating, is equal to or better than the reflectance of silver in telescope optics; and these coatings emit radiation at 140° F. more completely than the finest carbon black.

The compositions of this invention comprise from 25 to 35 parts by weight dry basis of fibrous potassium titanate, sufficient colloidal silica aquasol to give from 25 to 35 parts by weight dry basis of colloidal silica and sufficient latex-type elastomer emulsion to give from 1 to 3 parts by weight of a latex-type elastomeric polymer, all combined in an aqueous suspension. Of course such compositions when properly dried contain essentially no water, and the coatings formed therefor comprise from 25 to 35 parts by weight of fibrous potassium titanate, from 25 to 35 parts by weight of colloidal silica and from 1 to 3 parts by weight of an elastomeric polymer.

One of the essential ingredients of the compositions of this invention is a water-insoluble fibrous potassium titanate such as described in Berry, U.S. Patent No. 2,841,470, issued July 1, 1958. The ratio of $TiO_2$ to $K_2O$ in the potassium titanate can vary from 4.25 to 1 to 6.5 to 1, but ordinarily a ratio of from 4.8 to 1 to 5.5 to 1 is most satisfactory for use in the compositions of this invention. The formula for the potassium titanates used in this invention will correspond in crystal structure to $$K_2O \cdot (TiO_2)_4$$

or $K_2O \cdot (TiO_2)_6$, although continuously varying amounts of $K_2O$ may be removed by extractive means down to a residue of 5 percent of theory. These potassium titanate fibers must have a length to diameter ratio of more than 10:1 and less than 100:1. The diameter of the potassium titanate fibers suitable for use in the compositions of this invention must be less than about 0.6 micron and the preferred fibers will be the tetratitanate approximately .12 to .35 micron in diameter and less than about 20 microns and more than 3 microns in length which corresponds to the most desirable pigment size range. The pH of an agitated aqueous suspension of the potassium titanate will range from about 10 to 12 with the pH of about 10.9 being most desirable.

Colloidal silica, which is also an essential ingredient of the compositions of this invention, is preferably in the form of an aquasol. Such colloidal silica aquasols as those described in Alexander U.S. Patent No. 2,750,345 and Bechtold et al. U.S. Patent No. 2,574,902 are suitable for use in this invention. The colloidal silica particles will have an average ultimate size ranging from 5 to 15 millimicrons in diameter and will be characterized by having an $SiO_2$ to alkali oxide mole ratio of between 20 to 1 and 300 to 1. The aquasols will contain from 15 to 40% $SiO_2$ by weight. "Ludox"® SM colloidal silica, and aquasol sold by E. I. du Pont de Nemours and Company is well suited for use in this invention. It has an ultimate particle size of 7–9 m$\mu$, a $SiO_2$ to $Na_2O$ ratio of about 150:1 and contains about 15% of $SiO_2$ by weight.

The other essential ingredient of the compositions of this invention is a latex-type elastomeric polymer. Ordinarily, for convenience, the polymer will be used in the form of a water emulsion but such a form is not essential. Suitable latex-type elastomers for use in the compositions of this invention are those such as neoprene, a benzene soluble polymer of 2-chloro-1,3-butadiene or 2,3-dichloro-1,3-butadiene as disclosed in U.S. Patents Nos. 2,914,497 and 3,082,262; "Hypalon"® a chlorosulfonated polymer of ethylene as disclosed in U.S. Patent No. 2,586,363; fluoroelastomers such as those disclosed in U.S. Patents Nos. 3,051,677 and 2,968,649; and "Adiprene"® a urethane polymer which can be prepared by methods disclosed in U.S. Patent No. 3,133,853, issued May 19, 1964. A preferred elastomer is an aqueous dispersion of a neoprene elastomer containing about 44% chloroprene and about 56% dichlorobutadiene.

A preferred composition of this invention is one comprising about 30 parts by weight on a dry basis of a potassium titanate fiber having an average length of 3 to 20 microns, an average diameter of .12 to .35 micron and an alkali ratio of about 5.3 $TiO_2:K_2O$; sufficient "Ludox"® SM colloidal silica aquasol to give about 30 parts by weight on a dry basis of a colloidal silica having an average ultimate particle size of 7 to 9 m$\mu$; a sufficient amount of a neoprene emulsion to give about 2 parts by weight on a dry basis of a neoprene elastomer which is composed of about 44% chloroprene and 56% dichlorobutadiene; and sufficient water to obtain a uniform slurry. Such a composition demonstrates the most desirable balance of heat reflectance, adherability, and applicability when properly applied and dried.

The amount of water used in the aqueous compositions of this invention is generally not critical. The only limits are that sufficient water be present to enable a uniformly slurry to be obtained and that there be sufficeint dilution of the solids so that efficient application is possible. Generally the compositions can contain from about 100 to about 700 percent of water based on the dry basis weight of the other ingredients. A preferred amount of water in the compositions of this invention for ease of dispersion and handleability is about 250 to 350 weight percent based on the dry basis weight of the other ingredients.

The aqueous compositions of this invention are most easily prepared by dispersing potassium titanate fibers in water, adding to this dispersion the colloidal silica aquasol to be used, and mixing the ingredients with intensive agitation. Initially this composition is rheopectic; however, with continued agitation the composition becomes thixatropic and the solution becomes less viscous. The elastomeric material is then added to the composition and mixing is continued for about 20 minutes. If desired, a small amount of a conventional wetting agent such as "Triton®" X-100, which is isoctyl phenyl polyethoxy ethanol, "Alkanol®" DW, which is a sodium alkyl aryl sulfonate, "Alkanol®" HCS, a long chain alcohol condensate with ethylene oxide, "Nonic®" 218, polyethylene glycol tertdodecyl thioether, or "Neowet®", an organic thioether, can be added to the potassium titanate-fiber-colloidal silica aquasol mixture in order to facilitate their interdispersion. Similarly, clays such as "Ben-A-Gel EW®", a magnesium montmorillonite, can be added as dispersing or suspending agents.

Although the exact mechanism or co-action between the components of these compositions is not known, it has been ascertained that cohesive forces of a physical or chemical nature are developed between the particles of the colloidal silica and the fibrous potassium titanate. When the compositions of this invention are applied as a coating the potassium titanate fibers are apparently deposited in a random layer with colloidal silica particles adhering generously to their surface and bridging at points of near contact of the fibers. It is believed that most of the interstices between fibers are filled with colloidal silica granules. Upon heating the coatings to about 400 to 450° C. some mechanism occurs in which chemically bound water is driven off, and changes take place in the crystal structure such that the potassium titanate fibers are reduced substantially in length but remain bonded together by the colloidal silica which also loses chemically bound water at this temperature. The coating thereafter appears more homogeneous than before and further heating up to 1000° C. causes no further alteration.

If the size of either the colloidal silica or the potassium titanate starting materials varies markedly from the dimensions described herein, the apparent co-action of this invention, described above, is not obtained or is substantially reduced. As a result, a coating of such oversized or undersized dimensions lacks the desirable cohesiveness, adherability and fire resistance of the coatings of this invention.

The latex-type elastomers used in the compositions of this invention appear to wet potassium titanate fibers and colloidal silica with considerable ease, thereby facilitating application of the compositions of this invention. Addition of an elastomeric polymer increases the volume density of the composition to a greater degree than can be attributed to the amount of such elastomer that is added. The presence of such an elastomer demonstrably increases the adherability of the coating to the substrate, it also improves flexure, reduces cracking, facilitates cleaning or washing and aids in the dispersion of colors or tints when they are used.

Following the interdispersion of the components of this invention the composition can be diluted with water such as tap water to any desired consistency. The amount of water added will vary depending upon the consistency that is desired, but will most conveniently equal the volume of the slurry in a one to one dilution. The coatings may be applied in conventional ways such as by spraying or brushing. However, application by spraying is preferred as it avoids the need for a conventional prime coating which is usually required of brush application.

A dry coat thickness of the compositions of this invention of about 1 mil (0.001 inch) is essentially opaque to wave lengths of radiation emitted by flames. The composition should therefore be applied so as to provide a film of at least 1 mil thickness on the substrate being coated. Since the coating is to provide a heat-reflective surface, it is desired that the surface of the substrate be one which has physical smoothness and is not hairy so that hairs, fibers, or other projections of the substrate do not penetrate the film formed by these compositions. A film of 4 mils should be adequate for most applications where the substrate is of a smooth, nonfibrous type. The coating can be as thick as is desirable without any noticeable reduction in effectiveness. Coatings as thick as ¼ inch and thicker provide fire resistant, thermal insulation. However, for practical reasons, it is seldom advantageous to exceed a thickness of 8 mils.

These compositions may be applied to almost any type surface in which a fire-resistant thermal insulating or light reflectant coating would be desirable. Metal structure such as steel columns, beams, and panels may be coated in order to effectively insulate them with a thermal radiation reflector. Good bonding occurs between films formed from the compositions of this invention and such metal structures. Cellulosic materials such as wood, plywood, "Masonite®", "Celotex®", "Homosote®", "Upson®" board and other such materials are equally satisfactory substrates for the compositions of this invention. Other satisfactory substrates include glass, asbestos, glass fibers and mineral fibers such as rock wool, slag wool and synthetic inorganic fibers such as "Fiberfrax®", "Superglas®" and "Kaowool®".

The compositions of this invention may be applied over almost any type of commercial undercoat. When compositions of this invention are used to coat such conventional undercoats as alkyl primer sealers, vinyl sealer coats, undercoat paint thinners, undercoat paints and outercoat paints and sealers, there is no measurable reduction in effectiveness or adherence of the top coat.

Coatings of compositions of this invention, when dry, as color tints may be added to the compositions of this are very white and reflective. However, additives such as color tints may be added to the compositions of this invention to form pastel shades without markedly decreasing the effectiveness of their heat reflectance. Such color tints as iron oxide pigments can be added to produce pastel compositions. The flame indices of these compositions compare favorably to compositions which are not tinted.

In order that the invention may be better understood, the following illustrative examples are given wherein parts and percentages are by weight unless otherwise noted. In the examples, radiant panel flame spread tests are made in accordance with ASTM E162–60T.

Example 1

Thirty grams of PKT which is a pigmented fibrous potassium titanate having a ratio of $TiO_2:K_2O$ of 5.3:1, a diameter of approximately ¼ micron and a length of 10–20 microns is dispersed in 100 grams of water in a paddle agitator. The resulting slurry has a pH of 11. This slurry is mixed with 100 grams of an aqueous colloidal silica sol containing approximately 30% $SiO_2$ and having an ultimate particle size of 10–15 m$\mu$, a viscosity of 5 cps., a pH of 9.8 and having an $SiO_2$ to alkali oxide ratio of 95:1. To this mixture is added 4 grams of a 50% emulsion of a neoprene polymer latex composed of about 44% chloroprene and about 56% dichlorobutadiene. The pH of the final mixture is adjusted with 1 N HCl to 10.0.

Example 2

Thirty grams of fibrous potassium titanate as described in Example 1 are dispersed with vigorous agitation in 200 grams of a colloidal silica aquasol containing about 15% $SiO_2$, having an ultimate particle size of 7–9 m$\mu$, a viscosity of 4 cps., a pH of 8.5, and an SiO₂ to alkali oxide mole ration of about 150:1. To this mixture is added with agitation 4 grams of a 50% emulsion of a neoprene polymer latex composed of about 44% by weight chloroprene and about 56% dichlorobutadiene. The pH is adjusted to 10.9 with 1 N HCl.

Example 3

Fifty grams of PKT as described in Example 1 are extracted with sufficient HCl to give a TiO₂:K₂O ratio of 6.3:1 and dried. Thirty grams of this material is combined with agitation with 200 grams of aqueous colloidal silica sol as described in Example 2 and 7 grams of the 50% neoprene emulsion described in Example 2.

Example 4

Thirty grams of fibrous potassium titanate as described in Example 1, but having a TiO₂:K₂O ratio of 4.5:1, are dispersed with agiation in 200 grams of a colloidal silica aquasol as described in Example 2 and 6 grams of the 50% neoprene emulsion described in Example 2.

Example 5

The formulation as described in Example 2 is sprayed to a thickness when dried of 2 mils on a pressed bonded cellulosic composition board commercially available as "Celotex ®". The coated composition has a flame rating of 8 when tested in accordance with the procedure of ASTM E162–60T.

Example 6

The procedure of Example 5 is repeated with the formulation of Example 2 to give a coating of a thickness of 4 mils when dry. The coated composition has a flame rating of 4 when tested in accordance with the procedure of ASTM E162–60T.

Example 7

The procedure of Example 5 is repeated with the formulations of Examples 1, 3, and 4 to give a coating thickness of 4 mils when dry. The coatings exhibit similar outstanding flame ratings to that of Example 6.

Example 8

The procedure of Example 5 is repeated with the formulation of Example 2 to give a coating of a thickness of 6 mils when dry. The coated composition has a flame rating of 3 when tested in accordance with the procedure of ASTM E162–60T.

Example 9

The procedure of Example 5 is repeated with the formulation of Example 2 to give a coating of a thickness of 8 mils when dry. The coated composition has a flame rating of 3 when tested in accordance with the procedure of ASTM E162–60T.

Example 10

Sixty parts of fibrous potassium titanate as described in Example 1 are dispersed in 400 parts of aqueous colloidal silica sol as described in Example 2. To this mixture is added 4 parts by weight of a liquid urethane polymer prepared in accordance with the disclosure of U.S. Patent No. 3,133,853. The resulting formulation is applied as in Example 5 to give a dry coat thickness of 4 mils. The coated composition is tested according to ASTM E162–60T and has a flame rating of 10.

Example 11

Ninety parts of fibrous potassium titanate as described in Example 1 are dispersed in 600 parts of aqueous colloidal silica as described in Example 2. To this mixture is added 6 parts of "Viton ®" A fluoroelastomer. The resulting formulation is applied as in Example 5 to give a dry coat thickness of 4 mils. The coated composition is tested according to ASTM E162–60T and has a flame rating of 6.

Example 12

Thirty parts of fibrous potassium titanate as described in Example 1 are dispersed in 200 parts of aqueous colloidal silica as described in Example 2. To this mixture is added 2 parts of a chlorosulfonated polyethylene containing 30% chlorine and 1.4% sulfur. This formulation is applied as in Example 5 to a coating thickness of 4 mils. The coated composition has a flame rating of 15 when tested in accordance with ASTM E162–60T.

Example 13

The formulation as described in Example 2 is applied as in Example 5 to a coated pressed bonded paper pulp board commercially available as "Homosote ®" to a dry thickness of 4 mils. The coated composition has a flame rating of 12 when tested as in Example 5.

Example 14

The formulation as described in Example 2 is applied as in Example 5 to a dry thickness of 4 mils to a pressed cellulose board as described in Example 5 which is precoated with an alkyd based sealing composition commercially available as "Du Pont Primer Sealer." This coated composition has a flame rating of 4 when tested in accordance with ASTM E162–60T.

Example 15

Example 14 is repeated on a panel precoated with a sealer coated composition pigmented with TiO₂ and having a vinyl resin based vehicle commercially available as "Du Pont Sealer Coater." The flame rating of the coated composition is 6.

Example 16

Example 14 is repeated on a panel which has been precoated with a material consisting of 55% pigment, of which 30% is TiO₂, and 45% vehicle consisting of 32% alkyd resin, and 63% aliphatic hydrocarbons. The flame rating of the coated composition is 3.

Example 17

Example 14 is repeated on a panel precoated with a thixotropic acrylic latex wall paint commercially available as "Lucite ®" 2260. The flame rating of the coated composition is 3.

Example 18

Example 14 is repeated on a panel precoated with a composition containing 29% pigment of TiO₂ and Al₂O₃·3SiO₂ and a vehicle of 41% linseed alkyd resin and 28% aromatics. The coated composition has a flame rating of 6.

Example 19

Example 14 is repeated on a steel panel which is precoated with Am. Chem. "Granodine ®", a zinc phosphate undercoating for steel. The steel panel is tested and found to have excellent thermal insulation due to the 4 mil coating of the composition of Example 2 which serves as a thermal radiation reflector for the steel panel.

Example 20

To the mixture as described in Example 2 is added 2 grams of a pigment consisting of 12.5% copper phthalcyanine in a vehicle consisting of 25% dehydrated castor oil, commercially available as Du Pont Universal Tint No. 17. This mixture is applied to the cellulose board described in Example 5 to give a coating when dry which is 4 mils thick. The coated composition has a flame rating of 6.

Example 21

To the mixture as described in Example 2 is added 2 grams of a pigment having 72% red iron oxide in a vehicle consisting of 25% lethicin and 36% hydrocarbon, commercially available as Du Pont Universal Tint No. 26. This mixture is applied to the cellulose board as described in Example 5 to give a dry coating of 4 mils thickness. The coated composition has a flame rating of 6.

The invention claimed is:

1. An aqueous composition comprising 25 to 35 parts by weight of a water-insoluble fibrous potassium titanate pigment having a length to diameter ratio of from 10:1 to 100:1 and a diameter of less than 0.6 micron, sufficient colloidal silica aquasol in which the silica particles have an average ultimate particle size of 5 to 15 millimicrons to give 25 to 35 parts by weight dry basis of colloidal silica, and 1 to 3.5 parts by weight of a latex-type elastomer selected from the group of polymers consisting of chlorinated butadiene, chlorosulfonated polyethylene, fluoroelastomers, and urethane rubbers.

2. An aqueous composition comprising about 30 parts by weight of fibrous potassium titanate pigments having a $TiO_2$ to $K_2O$ ratio of from 4.25 to 1 to 6.5 to 1, a length to diameter ratio of from 10:1 to less than 100:1, and a diameter of from 0.1 to 0.6 micron; sufficient colloidal silica aquasol to give about 30 parts by weight dry basis of colloidal silica having an average ultimate particle size of from 5 to 15 m$\mu$ and a silica to alkali oxide mole ratio of between 20 to 1 and 300 to 1; and about 2 parts by weight of a polymer of 2-chloro-1,3-butadiene.

3. A method of insulating against radiant energy comprising applying to the material to be insulated a reflectant coating of a composition of claim 2.

4. An aqueous composition comprising about 30 parts by weight of fibrous potassium titanate pigments having a $TiO_2$ to $K_2O$ ratio of from 4.8:1 to 5.5:1, a length to diameter ratio of from 10:1 to 100:1, a diameter of 0.12 to 0.35 micron, and a length of 3 to 20 microns, about 200 parts by weight of a colloidal silica aquasol having a silica solids content of 15%, a silica ultimate particle size of from 7 to 9 m$\mu$ and a silica to alkali oxide mole ratio of about 150:1; and about 2 parts by weight of a polymer of 2-chloro-1,3-butadiene.

5. A heat reflectant coating comprised of 25 to 35 parts by weight of fibrous potassium titanate pigments having a length to diameter ratio of 10:1 to 100:1, and a diameter of from 0.1 to 0.6 microns; 25 to 35 parts by weight of a collodial silica having an average ultimate particle size of from 5 to 15 m$\mu$ and a silica to alkali oxide mole ratio of from 20:1 to 300:1; and 1 to 3.5 parts by weight of an elastomer selected from the group consisting of the polymers of chloroprene, fluorolelastomers, chlorosulfonated polyethylene and urethane.

6. A heat reflectant coating comprised of about 30 parts by weight of fibrous potassium titanate pigments having a length to diameter ratio of from 10:1 to 100:1, a diameter of from 0.12 to 0.35 micron and a length of from 3 to 20 microns; about 30 parts by weight of a collodial silica having an average ultimate particle size of from about 7 to 9 m$\mu$ and a silica to alkali oxide mole ratio of about 150:1; and about 2 parts by weight of a polymer of 2-chloro-1,3-butadiene.

References Cited by the Examiner

UNITED STATES PATENTS

| | | | |
|---|---|---|---|
| 2,574,902 | 11/1951 | Bechtold et al. | 252—313 |
| 2,702,284 | 2/1955 | Brock | 260—29.7 |
| 2,841,470 | 7/1958 | Berry | 23—51 |

MURRAY TILLMAN, *Primary Examiner.*

J. ZIEGLER, J. T. GOOLKASIAN,
*Assistant Examiners.*